Feb. 1, 1966   M. WUNDERLIN   3,233,079
HEATING APPARATUS FOR PLATE-LIKE HEAT STORAGE ELEMENTS
Filed July 24, 1963   4 Sheets-Sheet 1
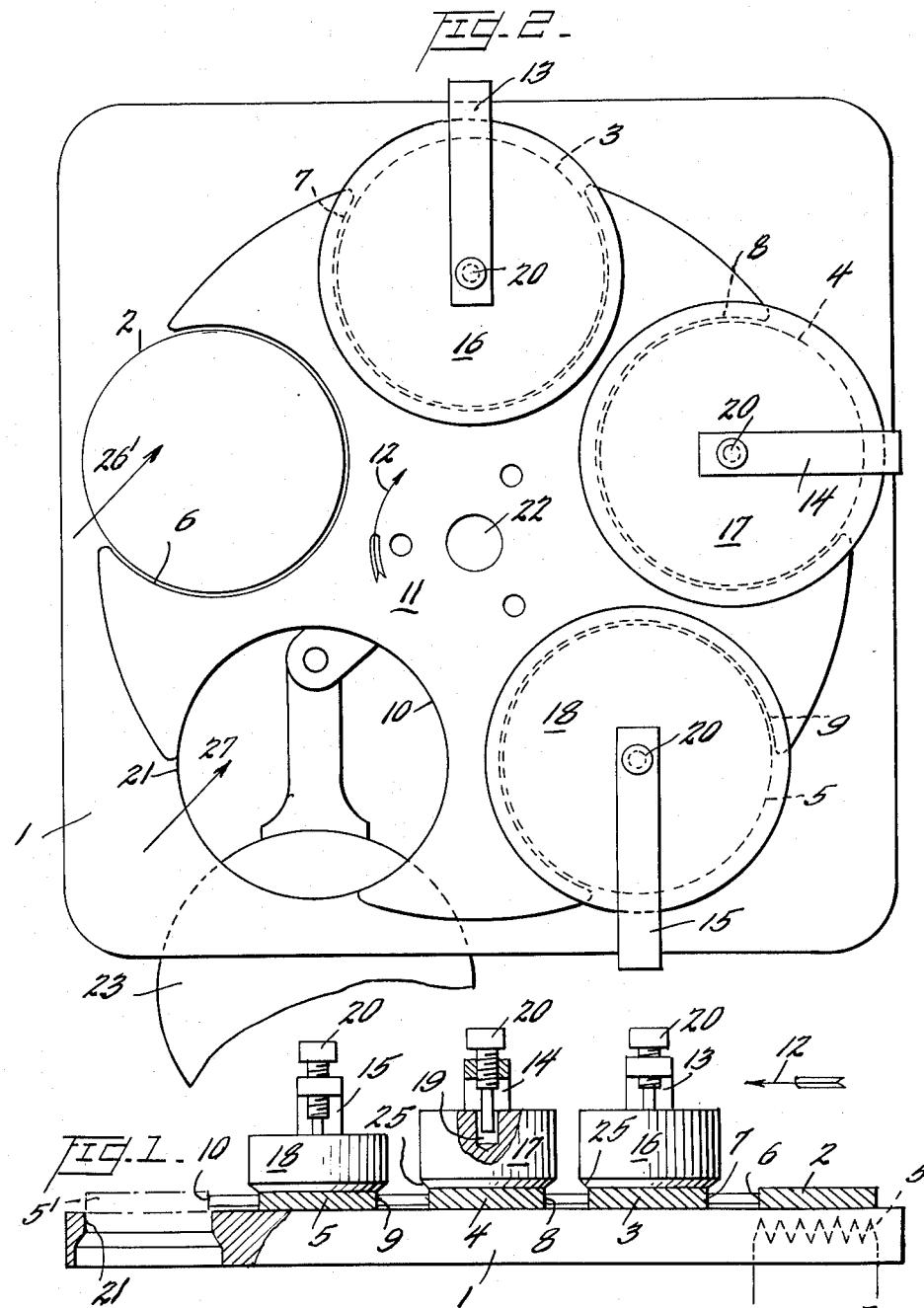
Inventor
Max Wunderlin,
BY
Watson, Cole, Grindle & Watson
ATTORNEYS

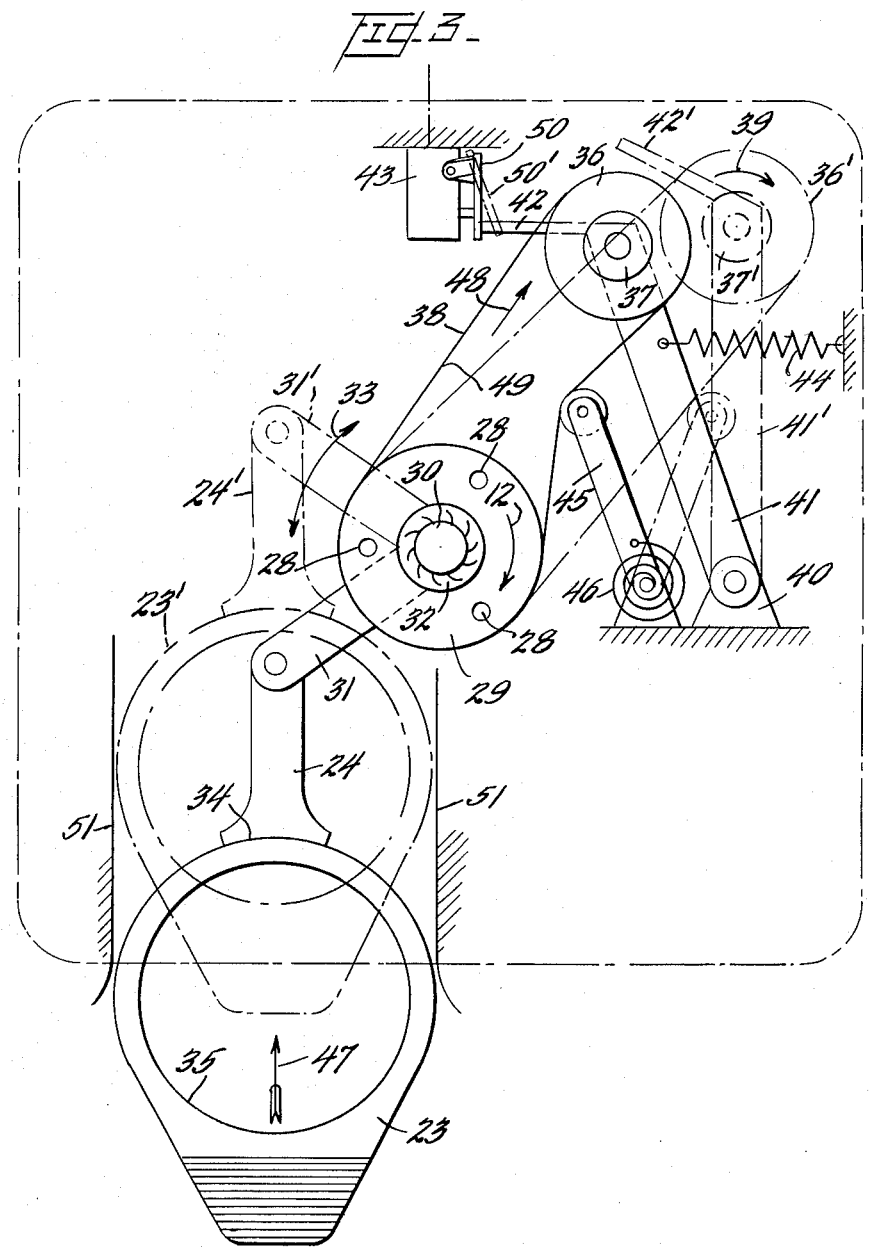

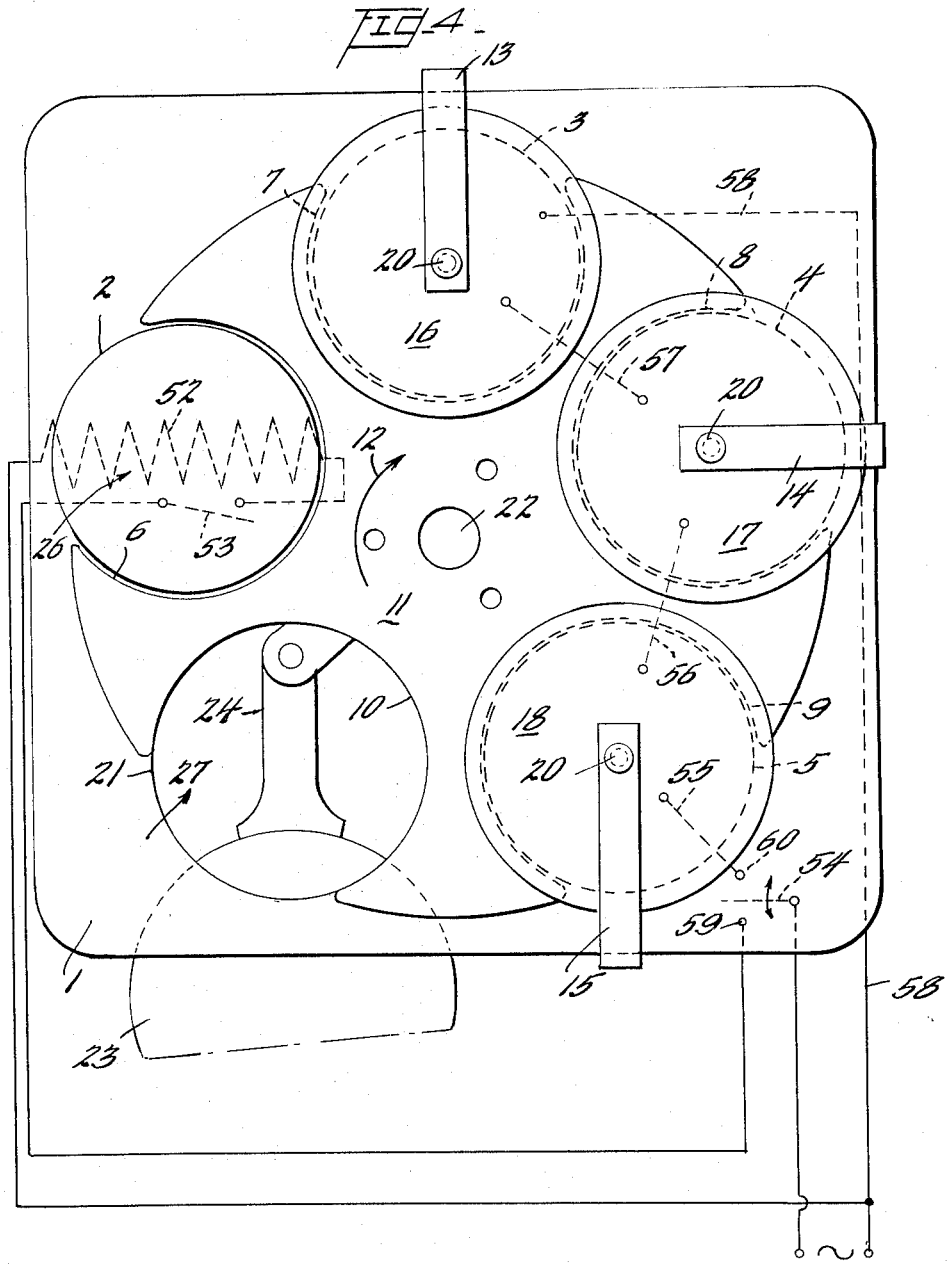

Feb. 1, 1966    M. WUNDERLIN    3,233,079
HEATING APPARATUS FOR PLATE-LIKE HEAT STORAGE ELEMENTS
Filed July 24, 1963    4 Sheets-Sheet 4
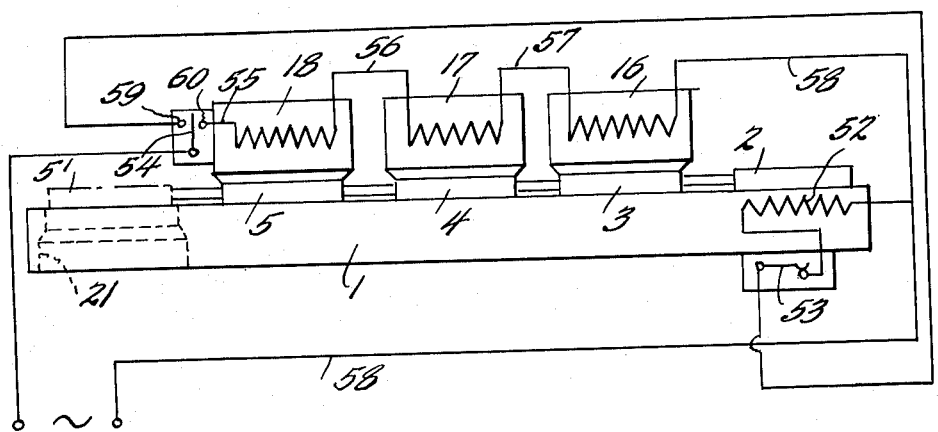
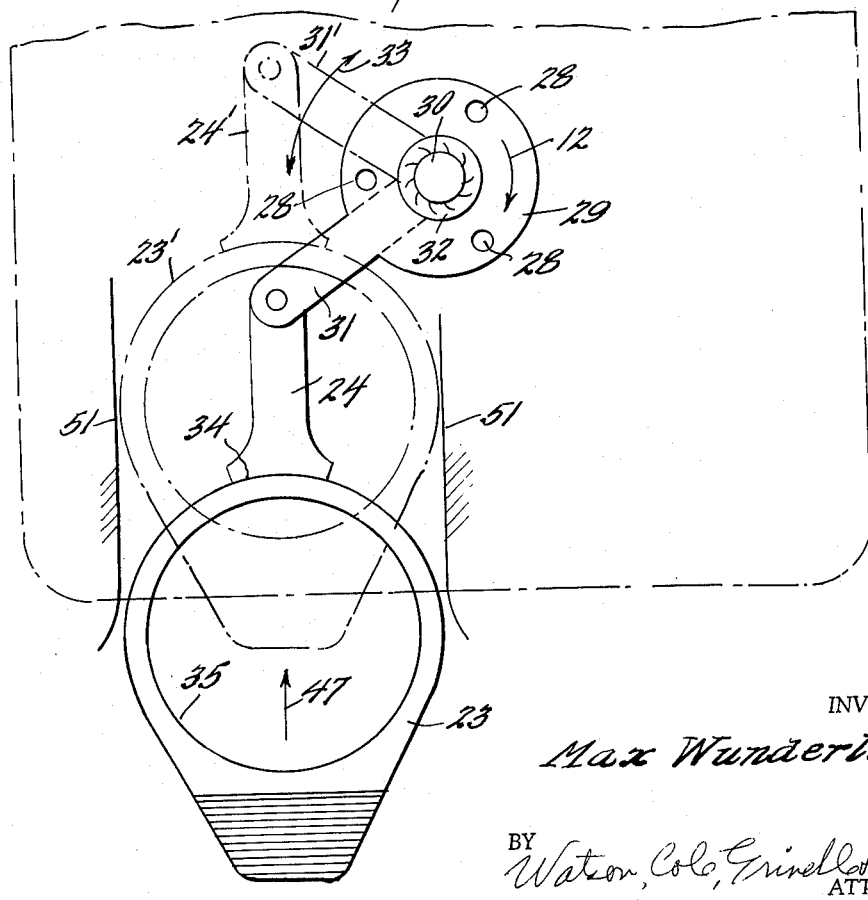
INVENTOR
Max Wunderlin,
BY Watson, Cole, Grinelled Watson
ATTORNEYS

United States Patent Office 3,233,079
Patented Feb. 1, 1966

3,233,079
HEATING APPARATUS FOR PLATE-LIKE
HEAT STORAGE ELEMENTS
Max Wunderlin, Alte Landstrasse 29,
Mannedorf, Zurich, Switzerland
Filed July 24, 1963, Ser. No. 297,266
Claims priority, application Austria, Aug. 6, 1962,
A 6,341/62
7 Claims. (Cl. 219—214)

This invention relates to a heating apparatus for plate-like heat storage elements, which elements are used in restaurants for keeping dishes, plates and the like warm.

In heating heat storage elements it is known to have them stacked in a heating chamber, from which they can be removed individually for use. Heat transfer from the heating chamber to the stacked heat storage elements is slow owing to the small free heating surface of the elements, so that a long time is required to heat the elements, and a very high heating performance of the heating chamber is necessary. Moreover, the single heating elements present in the stack can only be removed without trouble when expensive additional devices are provided.

The object of this invention is to create a heating apparatus, by means of which the heat is transferred rapidly and with high efficiency to the heat storage elements (hereinafter simply termed storage elements), so that all storage elements are heated up to the proper predetermined temperature, even if they are brought into the heating apparatus and taken away therefrom in large numbers per unit of time. Furthermore, by the construction of the heating apparatus simply taking away the heated storage elements shall be possible.

The apparatus according to the invention is principally characterized in that, as to several storage elements, each lies with its faces on the surface of a supporting base on the one hand, and on the surface of a heating element on the other hand, and the storage elements, movable intermittently in common, are movable to a delivery place for each delivered as to a heated storage element, and that, when the storage elements are stationary, only one storage element is provided at each heating element.

Further features of the invention will appear from the following description and claims, taken in conjunction with the accompanying drawing wherein there are shown, by way of example, two forms of heating apparatus with driving and delivery devices.

In said annexed drawings:

FIG. 1 is a side view partly in section of a heating apparatus for the storage elements;

FIG. 2 is a top view of the heating apparatus according to FIG. 1 on an enlarged scale with circular storage elements;

FIG. 3 is a top view of the driving and delivery devices for the storage elements, as arranged under the apparatus according to FIGS. 2 and 4;

FIG. 4 is a top view of a modified form of a heating apparatus;

FIG. 5 is a diagramamtic view showing the heating apparatus; and

FIG. 6 is a top view of a modified driving device.

Referring more particularly to FIG. 1, on a plate-like supporting base 1 there are provided storage elements 2, 3, 4, 5. The storage elements 2 to 5 rest in cutouts 6 to 9 of a cage 11. Cage 11 has still another cutout 10. Cage 11, formed as a disk (FIGS. 2 to 4), is rotatable intermittently about its axis 22 in the direction of the arrow 12; the cutouts 6 to 9 being provided on a circular path in the cage 11. In the structure according to FIG. 1 a rectilinear movement is possible in the direction of the arrow 12. Cage 11 is mounted on a bearing pin 30, FIG. 3, by means of a hole 22, FIG. 4, and in the center of the base 1, there is a hole for a sprocket wheel 29 which is fixed on the cage 11.

In three brackets 13 to 15, immovable relative to the base 1, the heating elements 16 to 18 are carried thereby, each displaceable normal to the surface of support 1. For this the heating elements 16 to 18 each have a bore 19, into each of which a screw 20, inserted in the brackets 13 to 15, projects with some lateral and axial clearance (FIG. 1).

In order that the storage elements, when carried along by the rotating cage 11, can slide well under the next heating element in spite of slight variations in thickness of the storage elements, the heating elements are made with chamfered edges 25 (FIG. 1).

The heating elements 16 to 18 each have a somewhat larger cross-sectional area than the storage elements 2 to 5. The base 1 has an aperture 21 for taking away a heated storage element. The result of the rapid heating element 18 is to ensure the heating of all storage elements to a predetermined temperature.

The heating elements 16 to 18 in the form according to FIGS. 1–3 each have a different electric performance, inasfar as element 16 heats to 90° C., the storage element 3 lying between it and base 1, heating element 17 heats the storage element 4 to 120° C., and heating element 18 heats storage element 5 to 150° C. Thereby the electric arrangement is such that each time only the two heating elements 16 and 17 are switched on together, the element 18 being switched on when elements 16 and 17 are switched off. Because of this, a constant load of, say 1200 watts, is needed for the whole apparatus.

The heating element 18 is designed as a rapid heating element which heats the storage element 5 up to the required temperature waiting to be taken away. The heating element 18 stores only very little heat and is switched on for a short time only. The switched-on time may for instance be determined by means of a time-relay or some other elements, and is fixed, say at five seconds. The heating element 18 is also provided in order to ensure heating all storage elements to a predetermined temperature, even if a large number thereof per unit of time are brought into the apparatus and taken away from it.

In the second form of embodiment according to FIG. 4, each of the heating elements 16 to 18 has a connected load of 400 watts. In the base 1 there is also a heating body 52 which has a connected load of 1200 watts. Inserted in the circuit of the heating body 52 are two thermostats 53, 54, the heating elements 16 to 18 being connected so that either only the three heating elements 16 to 18 or only the heating body 52 are switched on. The elements 16 to 18 are connected in series by means of the conductors 55 to 58. The whole connected load of the apparatus according to FIG. 4 is 1200 watts. The heating body 52, FIG. 1, is so built into the base 1 that, when it is switched on, the base 1 is heated. The portion of base 1 lying under the storage element 2 is the most intensely heated. The heating body 52 is only a heating wire as for instance as in an electric hot plate. The entire base 1 is a hot plate heated by the heating wire 1.

The supporting base 1—which in the second form according to FIG. 2 is designed as independent source of heat—and the storage elements 2 to 5 consist of a material of large specific heat, say of aluminum or magnesium and the like.

The method of operation of the first form of the heating apparatus according to FIGS. 1 to 3 is as follows:

If the apparatus is required for warming the storage elements, by means of an electric switch (not shown) the heating elements 16 and 17 are switched on with the cage at rest. In the apparatus there are three further storage elements 3, 4 and 5 between the heating elements 16 to 18 and the supporting base 1. A further storage element 2 is placed as reserve in cutout 6. An insulating plate 23 serves for removing the heated storage element from the apparatus. Said plate 23, guided in a slot 51 (FIG. 3), is pushed under the aperture 21 in base 1, so that the plate 23 lies entirely under the aperture 21. Thereby the insulating plate 23 causes displacement of a switch-arm 24, by which the intermittent rotary movement of cage 11 is switched on. Cage 11 rotates through 72 degrees, i.e. through the division of five cutouts 6 to 10 lying on a circular arc, in the direction of the arrow 12. Incidentally when the storage element 2 comes under the heating element 16, the storage element 3 then lies under the heating element 17, the storage element 4 under the heating element 18, the storage element 4 under the heating element 18 which is switched on at the commencement of the rotary movement, and the storage element 5 is in the position 5' and falls through the aperture 21 onto the underlying insulating plate 23, with which it is removed from the apparatus, to serve its purpose as plate warmer, etc.

By having the heating elements mounted with clearance at the shanks of the screws 20, the heating elements always lie completely on the storage elements, even if these vary in thickness and their flat surfaces are not quite parallel to each other.

As the cage 11 starts to rotate, the heating elements 16 and 17 are switched off from the electric source, and the heating element 18 is switched on, in order that storage element 5, to be removed following heating element 18, may have the required temperature. The heating elements 16 and 17 themselves store up a great amount of heat and serve, together with base 1, to heat the storage elements gradually and to keep them always warm.

By the heating element 18 becoming effective subsequently, continual insertion and removal of storage elements into or out of the apparatus is possible at very short intervals. Should these intervals be shorter than five seconds, the heating element 18 remains constantly switched on. But if the intervals are longer, heating element 18 or heating elements 16 and 17 are alternately switched on.

The method of operation of the second form of the apparatus according to FIG. 4 is as follows:

Thermostat 53 responds to the temperature of base 1 in the range of the storage element 2 and thermostat 54 responds to the temperature of base 1 in the range of the heating elements 16 to 18, as indicated on FIG. 5. If the temperature of base 1 at the storage element 2 (FIG. 2) falls below a certain definite value, thermostat 53 closes the electric contact. If the temperature of base 1 at the storage elements 16 to 18 exceeds a certain definite value, the thermostat 54 will be actuated to contact 59. But if the temperature of base 1 at the storage elements 16 to 18 falls below a certain definite value, thermostat 54 will contact 60.

With thermostat 53 closed and thermostat 54 on contact 59, the heating body 52 is switched on with its connected load of 1200 watts. If thermostat 54 actuates on contact 60, the heating elements 16 to 18 are switched on with their connected load of 1200 watts.

In the following a device is described for driving the cage 11 and the storage elements 2 to 5.

Cage 11 is intermittently rotated in the direction of the arrow 12, thus pushes the elements 2 to 5 lying on case 1 from a receiving place 26' to a delivery place 27 (FIG. 2).

By means of screws (not shown) engaging bores 28, the cage 11 is fixed on a sprocket wheel 29. On the bearing pin 30 of the sprocket wheel 29, arranged within the casing (not shown) of the device, an arm 31 is carried thereby. Between the bearing position of arm 31 and said wheel 29, there is provided a one-way lock 32 which, for instance, may be of the ratchet wheel type. By means of said lock 32, when arm 31 is rocked into the dot and dash line position 31', the sprocket wheel 29 is rotated clockwise. On the retroswing of arm 31 from the dot and dash line position 31' to the full line position shown, the sprocket wheel 29 is not carried along. Arm 31 can thus be rocked in the directions of the arrow 33, and the wheel 29 is only rotatable in the direction of the arrow 12. Arm 31 has another arm 24 pivoted thereto. Arms 31 and 24 together represent a linkage to be actuated by the insulating plate 23. Arm 24 has a concave recess 34 which corresponds to the outer contour of the insulating plate 23. If the insulating plate 23 is brought into position 23', FIG. 3, a depression 35 for receiving a storage element of plate 23 lies entirely under the aperture 21 in base 1, and arm 24 takes up the position 24'. When the linkage 24, 31 moves into position 24', 31', the sprocket wheel 29 and hence also cage 11 are rotated through 72 degrees, i.e. through the division of the five cutouts 6 to 10 on the circular path.

In order to facilitate rotation of cage 11, there is provided an electrically driven chain drive. A chain 38 runs on sprocket wheel 29 and on the driving sprocket wheel 36 of an electric motor 37. Motor 37 with sprocket wheel 36 rotating in the direction of the arrow 39, is mounted on a rocker arm 31 pivotal about the bearing block 40. Arm 41 includes a switch arm 42 for actuating an electric switch 43, by which motor 37 can be switched on and off. The rocker arm 41 is biased by a tension spring 44 which is fixed to the casing of the device. On chain 38 a chain tensioner 45 bears as biassed by a spiral spring 46.

The method of operation of the device is as follows:

If with the insulating plate 23, a storage element, as element 5 (FIG. 1) has to be taken away, plate 23 is pushed into the heating apparatus (FIG. 3) in the direction of the arrow 47. Thereby plate 23 lies against arm 24, and a torque is exerted on sprocket wheel 29. Since the pivot point of arm 41 does not lie on bearing pin 30, but on bearing block 40, through spring 44, a pull on chain 38 acts in the direction of the arrow 48, because the distance between centers of the two sprocket wheels 29 and 36 is increased when arm 41 rocks. The torque transmitted by hand to sprocket wheel 29 and the force of spring 44 acting on the tight side 49 of claim 38 cooperate to turn the sprocket wheel 29 and therewith the cage 11 by $\frac{1}{5}$ of a revolution so as to cause the structural parts 24, 31, 41, 36, 37 to take up the positions 24' 31', 41', 36', 37' shown in chain-dotted lines (FIG. 3). Incidentally storage element 5 has been transported to the position 5' (FIG. 1) over the aperture 21 in base 1 and falls onto insulating plate 23 which is in the position 23' and is then, together with element 5, taken from the apparatus. When storage element 23 is taken from the apparatus, the arms 24 and 31 return from the position 24' and 31' to their positions shown in full lines, owing to the action of a spring (not shown), whereas sprocket wheel 29 maintains its rotated position because of the one-way lock 32.

By the rotation of the sprocket wheel 29, the rocker arm 41 reaches position 41' and the switch-arm 42 into position 42' so that a contact 50 of the electric switch 42 takes up the position 50', whereby the electric motor 37 is switched on. Sprocket wheel 36 rolls away from its position 36' at the taut side 49 of chain 38 against the bias of spring 44 and returns to the position shown in full lines, in which the switch 43 is again actuated by switch-arm 42, and the electric motor 37 is stopped.

Instead of the tension spring 44 also a compression spring may be used; it is important that the rocker arm 41 at the chain-drive side, at which there is the taut side 49, can rock against the action of a spring or—if arm 41 has to be moved in a vertical plane—upwards against its own weight.

By the described device the cage 11 with mechanical members is moved without great force; thereby the electric motor 37 serves for storing up force, i.e. for tensioning the spring 44. An electric motor 37 with very low output may be used. Moreover, said motor 37 switches off automatically by the sprocket wheel 36 rolling away at the taut side 49 of chain 38 until contact 50 is actuated.

In the device according to FIGS. 1 to 3, alternate switching on and off the elements 16, 17 together with element 18 (FIGS. 1 and 2) is controlled by actuation of contact 50. If switch-arm 42 lies on contact 50, the two heating elements 16, 17 (FIGS. 1 and 2) lying on the storage elements 3 and 4 are switched on, and the heating element 18 lying on storage element 5 is switched off. If contact 50 is not actuated by arm 42, the elements 16, 17 lying on the elements 3 and 4 are switched off, and the heating element 18 lying on element 5 is switched on. This latter heating element remains switched on until the motor 37 has moved from its position 37' into the position shown in full lines. Upon each delivery of a fully heated storage element from the apparatus, the element 4 then lying in the place of element 5 is heated up by the powerful, rapid-heating element 18, whereby the time during which this heating element 18 is switched on is longer than the absolute time for delivering a storage element from the apparatus. The mechanism of the sprocket wheel 36 of motor 37, rolling automatically on chain 38, thus acts like a retarding relay which would be actuated by the insulating plate 23 and remain switched on beyond the delivery time for one storage element.

Cage 11 or storage elements 2–5 may also be driven without the auxiliary motor power shown by the structural parts 36–46 and 48–50 in FIG. 3. Cage 11 is thus moved alone manually by means of the insulating plate 23. All structural parts 36–46 and 48–50 may then be dispensed with as shown in FIG. 6. The heating elements 16–18 and heating member 52 are then switched on and off by means of the thermostats 53 and 54 according to FIG. 4.

What I claim is:

1. A heating apparatus for heating storage elements, comprising a supporting base, a plurality of heating elements supported on the supporting base to receive storage elements each of which lies with a face on surface of the supporting base and contacts a surface of the heating element, and means for intermittently moving said storage elements to a delivery place for each delivery of a heated storage element from the apparatus, and when said storage elements are stationary, one thereof will be adjacent each heating element.

2. A heating apparatus according to claim 1, in which the means includes a cage which is movable intermittently and the heat storage elements are held in the cage.

3. A heating apparatus according to claim 1, in which the means includes a cage which is movable intermittently and the heat storage elements are held in the cage, the cage being a rotating disk with cutouts for the heat storage elements to be inserted therein and the cutouts lying on a circular path.

4. A heating apparatus according to claim 1, in which the supporting base has an aperture therein for taking away a heat storage element.

5. A heating apparatus according to claim 1, in which the base has an independent source of heat and while switched on, has constantly a lower temperature than the heating elements that are switched on.

6. A heating apparatus according to claim 1, in which a heater is provided at the place of insertion for the storage elements for heating the base and which is arranged in the base.

7. A heating apparatus according to claim 1, in which the heating elements are connected in series in an electric circuit, and in which thermostats and a heater are provided serving for switching the heating elements and heater on and off so that either the heating elements or the heater are always switched on, or the heating elements and heating body are switched off.

References Cited by the Examiner

UNITED STATES PATENTS

| | | | |
|---|---|---|---|
| 1,067,152 | 7/1913 | Stagner | 126—246 |
| 1,769,752 | 7/1930 | Pais | 126—273.5 X |
| 2,694,131 | 11/1954 | Carson | 219—478 X |
| 2,696,813 | 12/1954 | Clarke | 126—246 |
| 2,735,921 | 2/1956 | Edgerton | 219—521 |
| 2,834,510 | 5/1958 | Cenotti | 221—150 X |
| 2,908,791 | 10/1959 | Torino et al. | 219—214 |
| 3,030,483 | 4/1962 | Rudolph et al. | 219—214 |
| 3,126,883 | 3/1964 | Hilfiker | 219—385 |
| 3,140,389 | 7/1964 | Windes | 219—447 |

FOREIGN PATENTS 624,615   4/1927   France.

RICHARD M. WOOD, *Primary Examiner.*

ANTHONY BARTIS, *Examiner.*

V. Y. MAYEWSKY, *Assistant Examiner.*